(12) United States Patent
Rubino et al.

(10) Patent No.: US 7,052,804 B2
(45) Date of Patent: May 30, 2006

(54) DOUBLE CURRENT COLLECTOR POSITIVE ELECTRODE FOR ALKALI METAL ION ELECTROCHEMICAL CELLS

(75) Inventors: Robert S. Rubino, Williamsville, NY (US); Hong Gan, East Amherst, NY (US); Esther S. Takeuchi, East Amherst, NY (US)

(73) Assignee: Wilson Greatbatch Technologies, Inc., Clarence, NY (US)

( * ) Notice: Subject to any disclaimer, the term of this patent is extended or adjusted under 35 U.S.C. 154(b) by 617 days.

(21) Appl. No.: 10/309,856

(22) Filed: Dec. 4, 2002

(65) Prior Publication Data

US 2003/0104270 A1    Jun. 5, 2003

Related U.S. Application Data

(60) Provisional application No. 60/336,604, filed on Dec. 5, 2001.

(51) Int. Cl.
*H01M 4/02*    (2006.01)
(52) U.S. Cl. .............. 429/231.95; 429/210; 429/218.1; 429/231.9; 429/213
(58) Field of Classification Search ................ 429/326, 429/324, 327, 330, 336, 338, 342, 231.95, 429/210, 218.1, 231.9, 213; 29/62.2
See application file for complete search history.

(56) References Cited

U.S. PATENT DOCUMENTS

| | | | |
|---|---|---|---|
| 4,310,609 A | 1/1982 | Liang et al. | |
| 5,443,928 A | 8/1995 | Takeuchi et al. | |
| 5,472,810 A | 12/1995 | Takeuchi et al. | |
| 5,516,340 A | 5/1996 | Takeuchi et al. | |
| 5,744,258 A | 4/1998 | Bai et al. | |
| 6,153,338 A | * 11/2000 | Gan et al. | ................... 429/326 |

* cited by examiner

*Primary Examiner*—Michael Barr
*Assistant Examiner*—Monique Wills
(74) *Attorney, Agent, or Firm*—Michael F. Scalise

(57) ABSTRACT

A new sandwich positive electrode design for a secondary cell is provided comprising a "sacrificial" alkali metal along with a cathode active material. In the case of silver vanadium oxide, the sacrificial alkali metal is preferably lithium. Upon activating the cells, the lithium metal automatically intercalates into the silver vanadium oxide. That way, the sacrificial lithium is consumed and essentially lithiates the silver vanadium oxide. This means that cathode active materials, such as silver vanadium oxide, which before now were generally only used in primary cells, are now useful in secondary cells. In some use applications, silver vanadium oxide is more desirable than typically used lithiated cathode active materials.

35 Claims, 1 Drawing Sheet

DOUBLE CURRENT COLLECTOR POSITIVE ELECTRODE FOR ALKALI METAL ION ELECTROCHEMICAL CELLS

CROSS REFERENCE TO RELATED APPLICATION

This application claims priority based on provisional application Ser. No. 60/336,604, filed Dec. 5, 2001.

BACKGROUND OF THE INVENTION

1. Field of Invention

This invention relates to the conversion of chemical energy to electrical energy. In particular, the present invention relates to a new cathode electrode design for a secondary electrochemical cell. The cathode electrode is comprised of a sacrificial piece of alkali metal sandwiched between two current collectors in turn supporting two structures of cathode active material opposite the alkali metal. Upon cell activation, the alkali metal is completely consumed in the cathode active structures. This enables the cathode active material to be those that are not typically used in rechargeable cells. A preferred alkali metal is lithium.

2. Prior Art

Rechargeable or secondary electrochemical cells shuttle alkali metal ions, such as lithium ions, between the anode electrode and the cathode electrode. There are three possible sources of alkali metal ions in a secondary cell. The least utilized is the electrolyte because removal of alkali metal ions from the electrolyte results in loss of its critical ion-conductive properties. The negative or anode electrode is another possible source of alkali metal ions. This requires use of an alkali metal or alloy thereof as the negative electrode. The problem is that poor cycling and safety characteristics limit the use of alkali metals as the negative electrode active material in rechargeable cells.

Consequently, the positive electrode is the source of alkali metal ions in almost all commercial non-aqueous rechargeable cells. This limits the choice of cathode active materials to those that contain alkali metal ions, such as $LiCoO_2$, $LiNiO_2$ and $LiMn_2O_4$. However, these materials have specific drawbacks such as low capacity, relatively high cost, insufficient rate capability, poor safety and poor cycleability. Alternate cathode active materials that are not typically used in rechargeable cells because they cannot be acceptably prepared to contain alkali metal ions are better suited to many applications. For example, some alternate cathode active materials have greater pulse capability than the typically used lithiated active materials. Pulse or rate capability is important when the cell is intended to power an implantable medical device such as a cardiac defibrillator. The challenge is, therefore, to incorporate alternate cathode active materials into rechargeable cells without sacrificing electrolyte conductivity, cycling efficiency and safety.

In that light, the present invention relates to rechargeable cells including a positive electrode comprising a "sacrificial" piece of alkali metal short-circuited to an ion-deficient cathode active material. The alkali metal provides alkali metal ions for the cathode electrode of the rechargeable cell. This allows for the effective utilization of cathode active materials that previously could not be incorporated into rechargeable electrochemical cells.

SUMMARY OF THE INVENTION

Accordingly, the present invention is directed to improving the performance of alkali metal-containing rechargeable cells through a new cathode electrode design. Rechargeable cells cycle between a charged and a discharged state as alkali metal ions shuttled between the anode electrode and the cathode electrode. Specifically, the present invention relates to a rechargeable cell having a cathode electrode composed of a piece of alkali metal sandwiched between layers of cathode active material capable of accepting and releasing cation of the alkali metal. The alkali metal and the cathode active material are, in effect, short-circuited such that the alkali metal reacts with the active material upon exposure to a suitable ion-conducting electrolyte. The capacity of the cathode active material dictates the quantity of alkali metal, which is completely consumed upon the cell being activated with electrolyte. Preferred cathode active materials are those capable of accepting and releasing alkali metal ions at a suitable voltage.

The new cathode electrode configuration is especially useful in rechargeable cell applications where increased energy density and rate capability in the power source are desired. Examples of this are cells powering implantable medical devices such as cardiac pacemakers, defibrillators, neurostimulators, drug pumps, and the like.

These and other objects of the present invention will become increasingly more apparent to those skilled in the art by reference to the following description and the appended drawings.

DETAILED DESCRIPTION OF THE PREFERRED EMBODIMENTS

Figure 1:
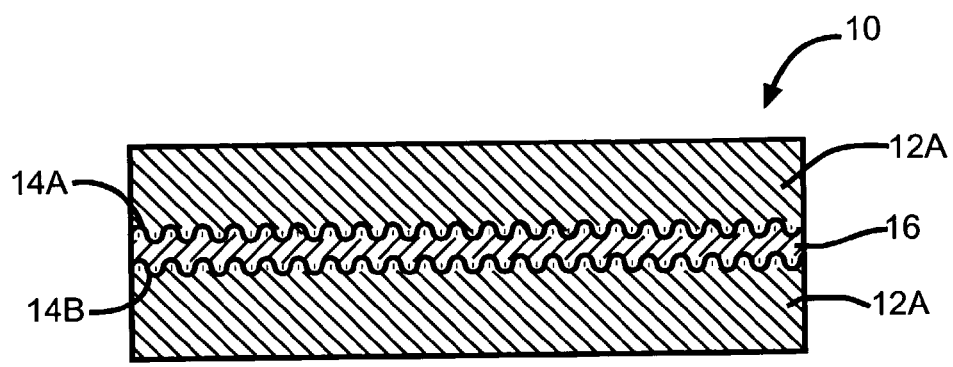
FIG. 1 is a schematic of one embodiment of a negative electrode according to the present invention.

The electrochemical cell of the present invention is of a secondary, rechargeable chemistry. The cell comprises an anode active metal selected from Groups IA, IIA and IIIB of the Periodic Table of the Elements, including lithium, sodium, potassium, etc.

In conventional secondary electrochemical systems, the anode or negative electrode comprises an anode material capable of intercalating and de-intercalating the anode active material, such as the preferred alkali metal lithium. Typically, the anode material of the negative electrode comprises any of the various forms of carbon (e.g., coke, graphite, acetylene black, carbon black, glassy carbon, etc.) that are capable of reversibly retaining the lithium species. Graphite is particularly preferred in conventional secondary cells. "Hairy carbon" is another particularly preferred conventional material due to its relatively high lithium-retention capacity. "Hairy carbon" is a material described in U.S. Pat. No. 5,443,928 to Takeuchi et al., which is assigned to the assignee of the present invention and incorporated herein by reference.

Regardless of the carbonaceous nature or makeup of the anode material, fibers are particularly advantageous. Fibers have excellent mechanical properties that permit them to be fabricated into rigid electrode structures capable of withstanding degradation during repeated charge/discharge cycling. Moreover, the high surface area of carbon fibers allows for rapid charge/discharge rates.

The negative electrode for a secondary cell is fabricated by mixing about 90 to 97 weight percent of the carbonaceous anode material with about 3 to 10 weight percent of a binder material, which is preferably a fluoro-resin powder such as polytetrafluoroethylene (PTFE), polyvinylidene fluoride (PVDF), polyethylenetetrafluoroethylene (ETFE), polyamides, polyimides, and mixtures thereof. This negative electrode admixture is provided on a current collector selected from copper, stainless steel, titanium, tantalum, platinum, gold, aluminum, nickel, cobalt nickel alloy, highly alloyed ferritic stainless steel containing molybdenum and chromium, and nickel-, chromium-, and molybdenum-containing alloys. The current collector is a foil or screen and contact is by casting, pressing, or rolling the admixture thereto.

Another type of anode material useful with the present invention is a metal that reversibly alloys with alkali metals. Such metals include, but are not limited to, Sn, Si, Al, Pb, Zn, Ag, SnO, $SnO_2$, SiO, and $SnO(B_2O_3)_x(P_2O_5)_y$. For a more detailed description of the use of these materials in the negative electrode of a secondary cell, reference is made to U.S. Pat. No. 6,737,191 to Gan et al. which is assigned to the assignee of the present invention and incorporated herein by reference.

The present invention takes advantage of active materials that are typically used as cathode active materials in primary cells, but which cannot normally be used in conventional secondary cells. The current art in rechargeable cells is to use the positive electrode as the source of alkali metal ions. This prohibits the use of metal-containing cathode active materials that do not contain alkali metal ions. Examples of such metal-containing materials include $V_2O_5$, $V_6O_{13}$, silver vanadium oxide (SVO), copper silver vanadium oxide (CSVO), $MnO_2$, $TiS_2$, $MoS_2$, $NbSe_3$, $CuO_2$, $Cu_2S$, FeS, $FeS_2$, $CF_x$, $Ag_2O$, $Ag_2O_2$, CuF, $Ag_2CrO_4$, copper oxide, copper vanadium oxide, and mixtures thereof. Certain polymers are also useful cathode active materials. Suitable polymers include, but not limited to, polypyrroles, polythiophenes, polysulfides, polyanilines, and polyacetylenes and mixtures thereof.

The use of these active materials in the positive electrode of a secondary cell normally requires the presence of an alkali metal anode or a pre-metalated anode material (most desirably carbon). The use of an alkali metal anode is undesirable because of the poor cycling and safety properties of these materials. Pre-metalated carbon materials are known in the art, but have never been commercialized because of difficulties in reliably manufacturing them.

Accordingly, the positive electrode of the present secondary cells is built in a double current collector configuration having a "sacrificial" piece of alkali metal, preferably lithium, sandwiched between the current collectors. A cathode active material capable of intercalation and de-intercalation the alkali metal contacts the opposite side of at least one, and preferably both, of the current collectors. The purpose of the sacrificial alkali metal is to react with the cathode active material upon the cell being activated with an electrolyte. The reaction results in a lithiated cathode active material.

Suitable current collectors are similar to those useful in the negative electrode and selected from copper, stainless steel, titanium, tantalum, platinum, gold, aluminum, nickel, cobalt nickel alloy, highly alloyed ferritic stainless steel containing molybdenum and chromium, and nickel-, chromium-, and molybdenum-containing alloys. An important aspect of the present invention is that the current collector have a sufficient amount of open area in the form of perforations and the like to provide for the alkali metal ions to move through it and intercalate the cathode active material. Preferably the current collector is a perforated foil or screen, such as an expanded screen.

Therefore, one exemplary positive electrode has cathode active material short-circuited to the alkali metal material by parallel connection through the current collectors. The following configuration is exemplary:

first cathode active material/current collector/alkali metal/current collector/second cathode active material, wherein the first and second cathode active materials are either the same or different.

A schematic of a positive electrode 10 according to this embodiment is shown in FIG. 1. This drawing shows two structures of cathode active material 12A and 12B contacted to the outer surfaces of respective perforated current collectors 14A and 14B. A layer 16 alkali metal contacts the opposite sides of the current collectors 14A, 14B, sandwiched between the cathode active material structures 12A, 12B.

Another embodiment of the present invention has the alkali metal sandwiched between the cathode active materials, in which the anode material is short circuited to the alkali metal by direct contact. This positive electrode has the configuration:

first cathode active material/current collector/second cathode active material/alkali metal/third cathode active material/current collector/fourth cathode active material, wherein the first, second, third and fourth cathode active materials are either the same or different.

Figure 2:
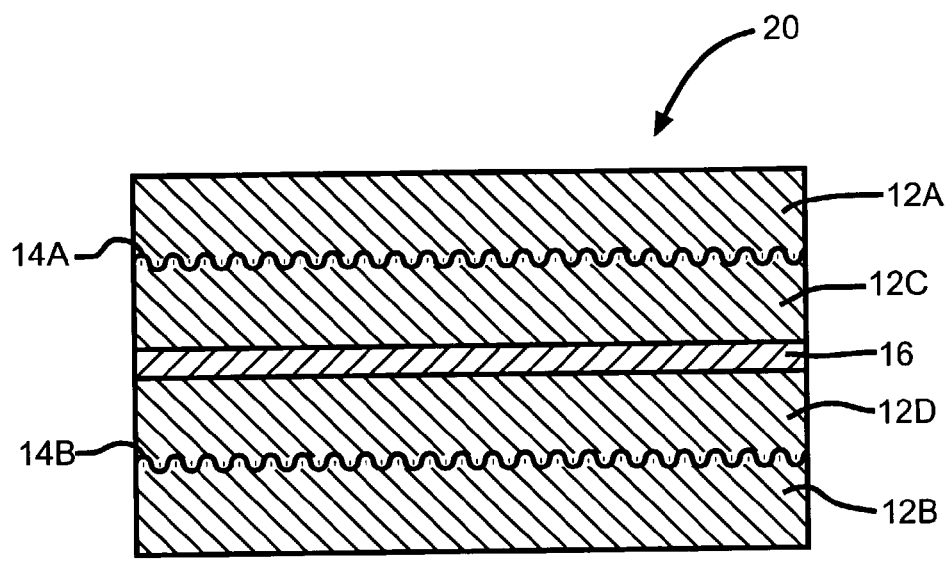
FIG. 2 is a schematic of a second embodiment of a negative according to the present invention.

A schematic of a positive electrode 20 according to this embodiment is shown in FIG. 2. This drawing shows two structures of cathode active material 12A and 12B contacted to the outer surfaces of respective perforated current collectors 14A and 14B. Instead of a layer of alkali metal contacting the current collectors, as in FIG. 1, additional cathode active structures 12C and 12D contact the opposite sides of the current collectors 14A, 14B. Then, a layer 16 of alkali metal is sandwiched between the cathode active material structures 12C, 12D.

A third exemplary embodiment of the present invention has the configuration:

cathode active material/current collector/alkali metal, wherein the cathode active material faces the negative electrode.

Preferred embodiments include the following positive electrode configurations:

vanadium oxide/current collector/lithium/current collector/vanadium oxide, or vanadium oxide/current collector/vanadium oxide/lithium/vanadium oxide/current collector/vanadium oxide, or vanadium oxide/current collector/lithium, with the vanadium oxide facing the negative electrode.

By the term "vanadium oxide" is meant $V_2O_5$, $V_6O_{13}$, silver vanadium oxide, and copper silver vanadium oxide.

With this double current collector electrode design, the amount of lithium metal is adjusted to fully lithiate the cathode active material. Upon activating the cell with an ion-conductive electrolyte, the alkali metal migrates into the cathode active material resulting in complete consumption of the alkali metal. The absence of the alkali metal in the cell preserves the desirable safety and cycling properties of the intercalation negative and positive electrodes.

As is the case with the above described carbonaceous anode materials, the metal-containing cathode materials are formed into a sandwich electrode body for incorporation into an electrochemical cell by mixing one or more of them with one of the above described binder materials. Further, up to about 10 weight percent of a conductive diluent is preferably added to the mixture to improve conductivity. Suitable materials for this purpose include acetylene black, carbon black and/or graphite or a metallic powder such as powdered nickel, aluminum, titanium and stainless steel. The preferred cathode material mixture thus includes a powdered fluoro-polymer binder present at about 1 to 5 weight percent, a conductive diluent present at about 1 to 5 weight percent and about 90 to 98 weight percent of the cathode active material.

To charge such secondary cells, the lithium ions comprising the positive electrode are intercalated into the anode material by applying an externally generated electrical potential to the cell. The applied recharging potential draws the lithium ions from the cathode active material, through the electrolyte and into the anode material to saturate it. In the case of a carbonaceous anode material, the resulting $Li_xC_6$ material can have an x ranging between 0.1 and 1.0. The cell is then provided with an electrical potential and discharged in a normal manner.

Positive electrodes for incorporation into an electrochemical cell according to the present invention may be prepared by rolling, spreading or pressing the cathode active formulations onto a suitable current collector of any one of the previously described materials suitable for the negative electrode. The preferred current collector material is aluminum. Positive electrodes prepared as described above may be in the form of one or more plates operatively associated with at least one or more plates of a negative electrode, or in the form of a strip wound with a corresponding strip of the negative electrode in a structure similar to a "jellyroll".

In order to prevent internal short circuit conditions, the negative electrode is separated from the positive electrode by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow there through of the electrolyte during the electrochemical reaction of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C.H. Dexter, Div., Dexter Corp.).

The electrochemical cell of the present invention further includes a non-aqueous, ionically conductive electrolyte which serves as a medium for migration of ions between the negative and positive electrodes during electrochemical reactions of the cell. A suitable electrolyte has an inorganic, ionically conductive salt dissolved in a non-aqueous solvent, and more preferably, the electrolyte includes an ionizable alkali metal salt dissolved in a mixture of aprotic organic solvents comprising a low viscosity solvent and a high permittivity solvent. The inorganic, ionically conductive salt serves as the vehicle for migration of the anode ions to intercalate or react with the cathode active materials. Preferably, the ion forming alkali metal salt is similar to the alkali metal comprising the anode active material.

In the case of an anode active material comprising lithium, the alkali metal salt of the electrolyte is a lithium based salt. Known lithium salts that are useful as a vehicle for transport of alkali metal ions between the negative electrode and the positive electrode include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

Low viscosity solvents useful with the present invention include esters, linear and cyclic ethers and dialkyl carbonates such as tetrahydrofuran (THF), methyl acetate (MA), diglyme, triglyme, tetragylme, dimethyl carbonate (DMC), 1,2-dimethoxyethane (DME), 1,2-diethoxyethane (DEE), 1-ethoxy,2-methoxyethane (EME), ethyl methyl carbonate (EMC), methyl propyl carbonate, ethyl propyl carbonate, diethyl carbonate (DEC), dipropyl carbonate, and mixtures thereof, and high permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-pyrrolidinone (NMP), and mixtures thereof.

A preferred electrolyte for a secondary cell according to the present invention comprises a solvent mixture of EC:DMC:EMC:DEC. Most preferred volume percent ranges for the various carbonate solvents include EC in the range of about 20% to about 50%; DMC in the range of about 12% to about 75%; EMC in the range of about 5% to about 45%; and DEC in the range of about 3% to about 45%. In a preferred form of the present invention, the electrolyte activating the cell is at equilibrium with respect to the ratio of DMC:EMC:DEC. This is important to maintain consistent and reliable cycling characteristics. It is known that due to the presence of low-potential (anode) materials in a charged cell, an un-equilibrated mixture of DMC:DEC in the presence of lithiated graphite ($LiC_6$~0.01 V vs $Li/Li^+$) results in a substantial amount of EMC being formed. When the concentrations of DMC, DEC and EMC change, the cycling characteristics and temperature rating of the cell also. Such unpredictability is unacceptable. This phenomenon is described in detail in U.S. Pat. No. 6,746,804 to Gan et al. which is assigned to the assignee of the present invention and incorporated herein by reference. Electrolytes containing the quaternary carbonate mixture of the present invention exhibit freezing points below −50° C., and lithium ion secondary cells activated with such mixtures have very good cycling behavior at room temperature as well as very good discharge and charge/discharge cycling behavior at temperatures below −40° C.

The assembly of the secondary cells described herein is preferably in the form of a wound element configuration. That is, the fabricated negative electrode, positive electrode and separator are wound together in a "jellyroll" type configuration or "wound element cell stack" such that the negative electrode is on the outside of the roll to make electrical contact with the cell case in a case-negative configuration. Using suitable top and bottom insulators, the wound cell stack is inserted into a metallic case of a suitable size dimension. The metallic case may comprise materials such as stainless steel, mild steel, nickel-plated mild steel, titanium, tantalum or aluminum, but not limited thereto, so long as the metallic material is compatible for use with the other cell components.

The cell header comprises a metallic disc-shaped body with a first hole to accommodate a glass-to-metal seal/terminal pin feedthrough and a second hole for electrolyte filling. The glass used is of a corrosion resistant type having up to about 50% by weight silicon such as CABAL 12, TA 23, FUSITE 425 or FUSITE 435. The positive terminal pin feedthrough preferably comprises titanium although molybdenum, aluminum, nickel alloy, or stainless steel can also be used. The cell header is typically of a material similar to that of the case. The positive terminal pin supported in the glass-to-metal seal is, in turn, supported by the header, which is welded to the case containing the electrode stack. The cell is thereafter filled with the electrolyte solution described hereinabove and hermetically sealed such as by close-welding a stainless steel ball over the fill hole, but not limited thereto.

The above assembly describes a case-negative cell, which is the preferred construction of the exemplary secondary cell of the present invention. As is well known to those skilled in the art, the present secondary electrochemical systems can also be constructed in case-positive configuration.

It is appreciated that various modifications to the inventive concepts described herein may be apparent to those of ordinary skill in the art without departing from the spirit and scope of the present invention as defined by the appended claims.

What is claimed is:

1. A positive electrode for incorporation into an electrochemical cell comprising a negative electrode of an anode material capable of intercalating and de-intercalating an alkali metal, the positive electrode comprising:
   a) a cathode active material contacted to one major side of a current collector with a sacrificial structure of the alkali metal contacted to the other major side thereof, wherein the cathode active material is selected from the group consisting of $V_2O_5$, $V_6O_{13}$, SVO, CSVO, $MnO_2$, $TiS_2$, $MoS_2$, $NbSe_3$, $CuO_2$, $Cu_2S$, FeS, $FeS_2$, $Ag_2O$, $Ag_2O_2$, CuF, $Ag_2CrO_4$, copper oxide, copper vanadium oxide, polypyrroles, polythiophenes, polysulfides, polyanilines, polyacetylenes, and mixtures thereof;
   b) wherein the positive electrode is positionable opposite the negative electrode with a separator provided intermediate the negative and positive electrodes to prevent direct physical contact between them; and
   c) wherein the negative and positive electrodes are activatable with an electrolyte to cause the sacrificial structure of alkali metal to be completely consumed in the cathode active material to thereby provide the electrocheinical cell.

2. The positive electrode of claim 1 wherein the alkali metal is selected from Group IA of the Periodic Tables of the Elements.

3. The positive electrode of claim 1 wherein the anode material is selected from the group consisting of coke, graphite, acetylene black, carbon black, glassy carbon, hairy carbon, hard carbon, Sn, Si, Al, Pb, Zn, Ag, SnO, $SnO_2$, SiO, $SnO(B_2O_3)_x(P_2O_5)_y$, and mixtures thereof.

4. The positive electrode of claim 1 wherein prior to being activated with the electrolyte, the positive electrode has the configuration: first cathode active material/current collector/sacrificial structure of alkali metal/current collector/second cathode active material, wherein the first and second cathode active materials are capable of intercalating and deintercalating the alkali metal and are the same or different.

5. The positive electrode of claim 1 wherein prior to being activated with the electrolyte, the positive electrode has the configuration; first cathode active material/current collector/second cathode active material/sacrificial structure of alkali metal/third cathode active material/current collector/fourth cathode active material, wherein the first, second, third and fourth cathode active materials are capable of intercalating and de-intercalating the alkali metal and are either the same or different.

6. The positive electrode of claim 1 wherein the cathode active material is positionable facing the negative electrode.

7. The positive electrode of claim 1 wherein the cathode active material is a vanadium oxide and prior to being activated with the electrolyte, the positive electrode has the configuration: vanadium oxide/current collector/sacrificial structure of lithium/current collector/vanadium oxide.

8. The positive electrode of claim 1 wherein the cathode active material is a vanadium oxide and prior to being activated with the electrolyte, the positive electrode has the configuration: vanadium oxide/current collector/sacrificial structure of lithium, with the vanadium oxide facing the negative electrode.

9. The positive electrode of claim 1 wherein the cathode active material is a vanadium oxide and prior to being activated with the electrolyte, the positive electrode has the configuration: vanadium oxide/current collector/vanadium oxide/sacrificial structure of lithium/vanadium oxide/current collector/vanadium oxide.

10. The positive electrode of claim 1, wherein prior to being activated with the electrolyte, the positive electrode has the configuration: cathode active material/current collector/sacrificial structure of lithium, with the cathode active material being positionable facing the negative electrode.

11. The positive electrode of claim 1 wherein the positive electrode includes nonactive materials selected from a binder material and a conductive additive.

12. The positive electrode of claim 11 wherein the binder material is a fluoro-resin powder.

13. The positive electrode of claim 11 wherein the conductive additive is selected from the group consisting of carbon, graphite powder, acetylene black, titanium powder, aluminum powder, nickel powder, stainless steel powder, and mixtures thereof.

14. A positive electrode for incorporation into an electrochemical cell comprising a negative electrode of an anode material capable of intercalating and de-intercalating an alkali metal, the positive electrode comprising:
   a) a cathode active material and a sacrificial structure of the alkali metal, wherein the sacrificial structure of alkali metal has spaced apart first and second major sides with at least one current collector contacting at least one of the first and second major sides and wherein the cathode active material is contacted to the at least one current collector opposite the alkali metal and wherein the cathode active material is capable of intercalating and de-intercalating the alkali metal, wherein the cathode active material is selected from the group consisting of $V_2O_5$, $V_6O_{13}$, SVO, CSVO, $MnO_2$, $TiS_2$, $MoS_2$, $NbSe_3$, $CuO_2$, $Cu_2S$, FeS, $FeS_2$, $Ag_2O$, $Ag_2O_2$, CuF, $Ag_2CrO_4$, copper oxide, copper vanadium oxide, polypyrroles, polythiophenes, polysulfides, polyanilines, polyacetylenes, and mixtures thereof;
   b) wherein the positive electrode is positionable opposite the negative electrode with the cathode active material on the opposite side of the at least one current collector facing the negative electrode and having a separator provided intermediate the negative and positive electrodes to prevent direct physical contact between them; and c) wherein the negative and positive electrodes are activatable with an electrolyte to cause the sacrificial structure of alkali metal to be completely consumed in the cathode active material to thereby provide the electrochemical cell.

15. The positive electrode of claim 14 wherein the positive electrode comprises first and second current collectors and prior to being activated with the electrolyte, has the configuration: first cathode active material/first current collector/sacrificial structure of alkali metal/second current collector/second cathode active material, wherein the first and second cathode active materials are capable of intercalating and de-intercalating the alkali metal and are the same or different.

16. The positive electrode of claim 14 wherein the cathode active material is a vanadium oxide and the positive electrode comprises first and second current collectors and prior to being activated with the electrolyte, has the configuration: vanadium oxide/first current collector/sacrificial structure of lithium/second current collector/vanadium oxide.

17. The positive electrode of claim 14 wherein the cathode active material is a vanadium oxide and the positive electrode comprises first and second current collectors and prior to being activated with the electrolyte, has the configuration: vanadium oxide/first current collector/vanadium oxide/sacrificial structure of lithium/vanadium oxide/second current collector/vanadium oxide.

18. The positive electrode of claim 14 wherein the cathode active material is a vanadium oxide and prior to being activated with the electrolyte, the positive electrode has the configuration: vanadium oxide/current collector/sacrificial structure of lithium, with the vanadium oxide positionable facing the negative electrode.

19. The positive electrode of claim 14 wherein the current collector is selected from the group consisting of copper, stainless steel, titanium, tantalum, platinum, gold, aluminum, cobalt nickel alloys, highly alloyed ferritic stainless steel containing molybdenum and chromium, and nickel-, chromium-, and molybdenum-containing alloy.

20. The positive electrode of claim 14 wherein the current collector is a perforated foil or screen.

21. The positive electrode of claim 14 wherein the electrolyte has a first solvent selected from an ester, a linear ether, a cyclic ether, a dialkyl carbonate, and mixtures thereof, and a second solvent selected from a cyclic carbonate, a cyclic ester, a cyclic amide, and mixtures thereof.

22. The positive electrode of claim 21 wherein the first solvent is selected from the group consisting of tetrahydrofuran, methyl acetate, diglyme, trigylme, tetragylme, dimethyl carbonate, 1,2-dimethoxyethane, 1,2-diethoxyethane, 1-ethoxy, 2-methoxyethane, ethyl methyl carbonate, methyl propyl carbonate, ethyl propyl carbonate, diethyl carbonate, dipropyl carbonate, and mixtures thereof, and the second solvent is selected from the group consisting of propylene carbonate, ethylene carbonate, butylene carbonate, acetonitrile, dimethyl sulfoxide, dimethyl formamide, dimethyl acetamide, γ-valerolactone, γ-butyrolactone, N-methyl-pyrrolidinone, and mixtures thereof.

23. The positive electrode of claim 14 wherein the electrolyte includes a lithium salt selected from the group consisting of $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

24. The positive electrode of claim 14 wherein the electrolyte is comprised of DMC, DEC, EMC and EC.

25. A positive electrode for incorporation into an electrochemical cell comprising a negative electrode of an anode material capable of intercalating and de-intercalating an alkali metal, the positive electrode comprising:
   a) a cathode active material contacted to one side of a current collector with a sacrificial structure of the alkali metal positioned on the opposite side of the current collector, wherein the cathode active material is capable of intercalating and deintercalating the alkali metal, wherein the cathode active material is selected from the group consisting of $V_2O_5$, $V_6O_{13}$, SVO, CSVO, $MnO_2$, $TiS_2$, $MOS_2$, $NbSe_3$, $CuO_2$, $Cu_2S$, FeS, $FeS_2$, $Ag_2O$, $Ag_2O_2$, CuF, $Ag_2CrO_4$, copper oxide, copper vanadium oxide, polypyrroles, polythiophenes, polysulfides, polyanilines, polyacetylenes, and mixtures thereof;
   b) wherein the positive electrode is positionable opposite the negative electrode with a separator provided intermediate the negative and positive electrodes to prevent direct physical contact between them; and
   c) wherein the negative and positive electrodes are activatable with an electrolyte to cause the sacrificial structure of alkali metal to be completely consumed in the cathode active material to thereby provide the electrochemical cell.

26. The positive electrode of claim 25 wherein the cathode active material is a vanadium oxide and prior to being activated with the electrolyte, the positive electrode has the configuration: vanadium oxide/current collector/sacrificial structure of lithium, and wherein the vanadium oxide faces the negative electrode.

27. A method for providing an electrochemical cell, comprising the steps of:
   a) providing a negative electrode of an anode material capable of intercalating and deintercalating an alkali metal;
   b) providing a positive electrode of a sacrificial structure of the alkali metal short circuited with a cathode active material and including selecting the cathode active material from the group consisting of $V_2O_5$, $V_6O_{13}$, SVO, CSVO, $MnO_2$, $TiS_2$, $MoS_2$, $NbSe_3$, $CuO_2$, $Cu_2S$, FeS, $FeS_2$, $Ag_2O$, $Ag_2O_2$, CuF, $Ag_2CrO_4$, copper oxide, copper vanadium oxide, and mixtures thereof;
   c) a separator provided intermediate the negative and positive electrodes to prevent direct physical contact between them; and
   d) activating the negative electrode and the positive electrode with a nonaqueous electrolyte to thereby cause the sacrificial structure of alkali metal to be completely consumed in the cathode active material.

28. The method of claim 27 including providing the positive electrode having the configuration: first cathode active material/current collector/sacrificial structure of alkali metal/current collector/second cathode active material, wherein the first and second cathode active materials are capable of intercalating and de-intercalating the alkali metal and are the same or different.

29. The method of claim 27 including providing the positive electrode having the configuration: first cathode active material/current collector/second cathode active material/sacrificial structure of alkali metal/third cathode active material/current collector/fourth cathode active material, wherein the first, second, third and fourth cathode active materials are capable of intercalating and de-intercalating the alkali metal and are either the same or different.

30. The method of claim 27 including providing the positive electrode having the configuration: cathode active material/current collector/sacrificial structure of alkali metal, wherein the cathode active material is capable of intercalating and de-intercalating the alkali metal and faces the negative electrode.

31. The method of claim 27 including providing the cathode-active material as a vanadium oxide with the positive electrode having the configuration: vanadium oxide/current collector/sacrificial structure of lithium/current collector/vanadium oxide.

32. The method of claim 27 including providing the cathode active material as a vanadium oxide with the positive electrode having the configuration: vanadium oxide/current collector/sacrificial structure of lithium, with the vanadium oxide facing the negative electrode.

33. The method of claim 27 including providing the cathode active material as a vanadium oxide selected from the group consisting of $V_2O_5$, $V_6O_{13}$, silver vanadium oxide, copper silver vanadium oxide, and mixtures thereof.

34. The method of claim 27 including providing the anode material as a carbonaceous material selected from the group consisting of coke, graphite, acetylene black, carbon black, glassy carbon, hairy carbon, hard carbon, Sn, Si, Al, Pb, Zn, Ag, SnO, $SnO_2$, SiO, $SnO(B_2O_3)_x(P_2O_5)_y$, and mixtures thereof.

35. The method of claim 27 including short circuiting the sacrificial structure of alkali metal to the cathode active material through a current collector of a perforated foil or screen.

* * * * *